US010084188B2

(12) United States Patent
Mori et al.

(10) Patent No.: US 10,084,188 B2
(45) Date of Patent: Sep. 25, 2018

(54) POSITIVE ELECTRODE ACTIVE SUBSTANCE FOR NONAQUEOUS ELECTROLYTE SECONDARY CELL, METHOD FOR PRODUCING SAME, AND NONAQUEOUS ELECTROLYTE SECONDARY CELL USING POSITIVE ELECTRODE ACTIVE SUBSTANCE

(71) Applicant: SUMITOMO METAL MINING CO., LTD., Tokyo (JP)

(72) Inventors: Kensaku Mori, Ehime (JP); Masanori Takagi, Ehime (JP); Koji Yamaji, Ehime (JP); Takehide Honma, Ehime (JP); Ryozo Ushio, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/411,192

(22) PCT Filed: Jul. 1, 2013

(86) PCT No.: PCT/JP2013/067990
§ 371 (c)(1),
(2) Date: Dec. 24, 2014

(87) PCT Pub. No.: WO2014/010448
PCT Pub. Date: Jan. 16, 2014

(65) Prior Publication Data
US 2015/0188136 A1    Jul. 2, 2015

(30) Foreign Application Priority Data

Jul. 12, 2012  (JP) ................. 2012-156632

(51) Int. Cl.
*H01M 4/525* (2010.01)
*C01G 53/00* (2006.01)
*H01M 4/131* (2010.01)
*H01M 10/052* (2010.01)
*H01M 4/02* (2006.01)

(52) U.S. Cl.
CPC .......... *H01M 4/525* (2013.01); *C01G 53/006* (2013.01); *C01G 53/42* (2013.01); *C01G 53/50* (2013.01); *C01G 53/66* (2013.01); *C01P 2004/62* (2013.01); *C01P 2006/11* (2013.01); *C01P 2006/12* (2013.01); *C01P 2006/40* (2013.01); *H01M 4/131* (2013.01); *H01M 10/052* (2013.01); *H01M 2004/028* (2013.01); *H01M 2220/30* (2013.01)

(58) Field of Classification Search
CPC .... H01M 4/04; H01M 4/0471; H01M 4/0479; H01M 4/46; H01M 4/131; H01M 4/525; H01M 4/362; H01M 10/052
See application file for complete search history.

(56) References Cited

U.S. PATENT DOCUMENTS 7,981,546 B2 *  7/2011  Takeuchi ............... H01B 1/122
                                                          252/518.1
2004/0161668 A1  8/2004  Maeda et al.
2004/0197658 A1  10/2004  Kase et al.
2004/0201948 A1  10/2004  Hosoya et al.
2009/0035659 A1  2/2009  Takeuchi et al.
2013/0189581 A1 *  7/2013  Imaizumi ............. C01G 23/002
                                                          429/223

FOREIGN PATENT DOCUMENTS

| JP | 5-242891 A | 9/1993 |
|---|---|---|
| JP | 8-45509 A | 2/1996 |
| JP | 8-213015 A | 8/1996 |
| JP | 9-298062 A | 11/1997 |
| JP | 11-25980 A | 1/1999 |
| JP | 2003-168428 A | 6/2003 |
| JP | 2004-111076 A | 4/2004 |
| JP | 2004-171961 A | 6/2004 |
| JP | 2004-273451 A | 9/2004 |
| JP | 2004-319105 A | 11/2004 |
| JP | 2005-251756 | 9/2005 |
| JP | 2006-310181 A | 11/2006 |
| JP | 2008-153017 A | 7/2008 |
| JP | 2008-218122 | 9/2008 |
| JP | 2008-234926 | 10/2008 |
| JP | 2009-176533 A | 8/2009 |
| JP | 2010-064944 A | 3/2010 |
| JP | 2010064944 | * 3/2010 |
| JP | 2011-201764 A | 10/2011 |
| JP | 2011201764 | * 10/2011 |
| JP | 2012-022896 A | 2/2012 |
| JP | 2012-28163 A | 2/2012 |
| JP | 2012-243463 A | 12/2012 |
| WO | WO2006118013 | * 11/2006 |
| WO | WO2012011212 | * 1/2012 |

OTHER PUBLICATIONS

International Search Report dated Sep. 17, 2013 issued in corresponding application No. PCT/JP2013/067990.
Office Action dated Mar. 21, 2017, issued in counterpart Japanese Patent Application No. 2014-524741, with English translation. (9 pages).
Office Action dated Nov. 30, 2016, issued in counterpart Korean Patent Application No. 10-2015-7000525, with English translation. (9 pages).

* cited by examiner

*Primary Examiner* — Ula C Ruddock
*Assistant Examiner* — Thomas H Parsons
(74) *Attorney, Agent, or Firm* — Westerman, Hattori, Daniels & Adrian, LLP (57) ABSTRACT

A positive electrode active material is provided that has a high capacity, a low irreversible capacity, an excellent initial charge/discharge efficiency, and excellent rate characteristics. This positive electrode active material comprises a hexagonal lithium nickel complex oxide having a layer structure and represented by the general formula $Li_xNi_{1-y-z}Co_yM_zO_2$ ($0.98 \leq x \leq 1.04$, $0.25 \leq y \leq 0.40$, $0 \leq z \leq 0.07$, and M is at least one element selected from Al, Ti, Mn, Ga, Mg, and Nb), wherein a lithium occupancy rate in a lithium main layer as obtained by Rietveld analysis from the x-ray diffraction pattern is at least 98.7%, and a crystallite diameter as calculated from the peak for the (003) plane in x-ray diffraction is 50 to 300 nm.

17 Claims, 2 Drawing Sheets

POSITIVE ELECTRODE ACTIVE SUBSTANCE FOR NONAQUEOUS ELECTROLYTE SECONDARY CELL, METHOD FOR PRODUCING SAME, AND NONAQUEOUS ELECTROLYTE SECONDARY CELL USING POSITIVE ELECTRODE ACTIVE SUBSTANCE

TECHNICAL FIELD

The present invention relates to a positive electrode active material for use in nonaqueous electrolyte secondary batteries and to nonaqueous electrolyte secondary batteries that use this positive electrode active material.

BACKGROUND ART

The spread of mobile and portable electronic devices, such as cell phones and notebook computers, in recent years has been accompanied by a strong desire for the development of nonaqueous electrolyte secondary batteries that are small, light, and have a high energy density. Lithium ion secondary batteries are such a secondary battery. Materials capable of the extraction insertion of lithium are used for the positive electrode and negative electrode materials of lithium ion secondary batteries.

Research and development is also currently being actively carried out into the positive electrode materials in such lithium ion secondary batteries. Within this sphere, lithium ion secondary batteries that use a lithium metal complex oxide—and particularly the relatively easy-to-synthesize lithium cobalt complex oxide ($LiCoO_2$)—for the positive electrode material provide high voltages in the 4 V class and for this reason their practical application as high energy density batteries is moving forward. A great deal of research has been carried out to date in order to obtain excellent initial capacity characteristics and excellent cycle characteristics from lithium ion secondary batteries that use this lithium cobalt complex oxide, and various outcomes have already been obtained.

However, expensive and production-constrained cobalt compounds are used as starting materials for lithium cobalt complex oxide, which causes higher battery costs. As a consequence, there is desire for the use of something other than lithium cobalt complex oxide as a positive electrode active material.

In addition, aside from use as small-scale secondary batteries for mobile and portable electronic devices, expectations have also been increasing with regard to the application of lithium ion secondary batteries as large-scale secondary batteries, for example, for power storage and electric vehicles. As a consequence, ripple effects into a broad range of fields can be expected if the active material costs can be reduced to thereby make possible the production of less expensive lithium ion secondary batteries.

Lithium manganese complex oxide ($LiMn_2O_4$) and lithium nickel complex oxide ($LiNiO_2$) are examples of materials that have been newly introduced as positive electrode active materials for lithium ion secondary batteries; these use, respectively, manganese and nickel, which are less expensive than cobalt.

Due to the low cost of its starting materials and its excellent thermal stability and particularly its excellent safety with regard to, e.g., ignition, lithium manganese complex oxide can be regarded as a strong substitute material for lithium cobalt complex oxide. However, since its theoretical capacity is only about one-half that of lithium cobalt complex oxide, one problem associated with lithium manganese complex oxide is the difficulty in responding to the ever increasing requirements for higher capacities for lithium ion secondary batteries. Another problem is that, at 45° C. and above, substantial self-discharge occurs and the charge/discharge life is also reduced.

Lithium nickel complex oxide, on the other hand, has about the same theoretical capacity as lithium cobalt complex oxide and exhibits a battery voltage somewhat lower than that of lithium cobalt complex oxide. As a consequence, the problem of oxidative decomposition of the electrolyte solution is suppressed and a higher capacity can be expected and active development has been underway as a result. However, one problem is that a lithium ion secondary battery fabricated using a lithium nickel complex oxide formed using only nickel by itself—without substituting another element for the nickel—as its positive electrode active material has cycle characteristics that are inferior to those for lithium cobalt complex oxide. Another problem has been that the battery performance is relatively easily impaired by use or storage in a high-temperature environment.

In order to solve these problems, for example, Patent Documents 1 to 3 introduce, with the goal of maintaining a good battery performance during storage or use in a high-temperature environment, lithium-containing complex oxides in which a portion of the nickel in lithium nickel complex oxide has been substituted by an element such as boron, cobalt, or aluminum. For example, certain effects, such as a suppression of the decomposition reactions of the positive electrode active material and an improvement in the thermal stability, have been confirmed when aluminum is selected as the actual substituting metal and a large amount of the nickel is substituted by aluminum. An improvement in the cycle characteristics has been confirmed for the substitution of a portion of the nickel with cobalt.

These is no doubt that these substituting elements are useful for solving some of the problems associated with lithium nickel composite oxide; however, in order to bring out the intrinsic properties of lithium nickel complex oxide, it is most important that the crystal structure of lithium nickel complex oxide be finely controlled, and proposals have been made to improve the battery characteristics by tuning the crystal structure.

For example, Patent Document 4 discloses a positive electrode active material in which the nickel occupancy rate at the 3a site in the crystal structure is 1.5 to 2.9%. Patent Document 5 discloses a positive electrode active material that can—by having the lithium occupancy rate at the 3a site be at least 98.5% and the metal occupancy rate at the 3b site be 95 to 98% —simultaneously achieve an increase in the capacity and an increase in the output.

However, a problem with the controlled-crystal structure lithium nickel complex oxides as described above is their large irreversible capacity, which is the difference between the initial charging capacity and the initial discharge capacity. The appearance of a large irreversible capacity, i.e., a low initial charge/discharge efficiency, has required that the capacity of the negative electrode be raised in order to absorb the irreversible capacity fraction and has been an impediment to raising the battery capacity since the capacity per unit volume for the battery as a whole ends up declining.

For example, Patent Document 6 discloses a positive electrode active material that is characterized by a lithium ion occupancy rate at the 3a site according to the results of Rietveld analysis in x-ray diffraction of at least 97%. It is suggested that the lithium occupancy rate at the 3a site influences the irreversible capacity and that it is possible to raise the initial charge/discharge capacity and reduce the irreversible capacity by bringing about an increase in this lithium occupancy rate. However, an initial charge/discharge efficiency greater than 90.0% has not been obtained and the irreversible capacity in the initial charge/discharge of lithium nickel complex oxide has still remained large, and obtaining an initial charge/discharge efficiency of greater than 90% has been problematic.

Moreover, vehicle-mounted batteries—as in hybrid vehicles (HEV), which combine two types of drive power sources (gasoline engine and electric motor), and electric vehicles (EV)—are required not only to have a high capacity, but to also exhibit high output characteristics, i.e., an excellent rate characteristic.

For example, Patent Document 7 discloses a nonaqueous electrolyte secondary battery that has excellent output characteristics; this nonaqueous electrolyte secondary battery has a first positive electrode active material that has a high Ni content and a large average particle diameter, a second positive electrode active material that has a low Ni content and a small average particle diameter, and a first electroconductive auxiliary agent and a second electroconductive auxiliary agent having different average particle diameters. However, this does not reach to an improvement in the rate characteristic of lithium nickel complex oxide itself.

CITATION LIST

Patent Literature

[Patent Document 1] Japanese Patent Application Laid-open No. H8-45509
[Patent Document 2] Japanese Patent Application Laid-open No. H8-213015
[Patent Document 3] Japanese Patent Application Laid-open No. H5-242891
[Patent Document 4] Japanese Patent Application Laid-open No. H9-298062
[Patent Document 5] Japanese Patent Application Laid-open No. 2008-218122
[Patent Document 6] Japanese Patent Application Laid-open No. 2003-168428
[Patent Document 7] Japanese Patent Application Laid-open No. 2012-243463

SUMMARY OF INVENTION

Technical Problem

An object of the present invention is to provide a positive electrode active material that has a high capacity and a low irreversible capacity and particularly an excellent initial charge/discharge efficiency, and that has an excellent rate characteristic. A further object of the present invention is to provide a method of producing this positive electrode active material.

Solution to Problem

The present inventors obtained the following knowledge as a result of intensive investigations into improving the irreversible capacity, the initial charge/discharge efficiency, and the rate characteristic of nickel complex oxides: the degree of perfection of the crystal structure and also the irreversible capacity during initial charge/discharge and the initial charge/discharge efficiency may all be varied through the ratio between the nickel and cobalt in the composition and through the ratio between the lithium and non-lithium metal elements. The present inventors also obtained the following knowledge: a lithium nickel complex oxide with a high degree of crystal structure perfection can be obtained by establishing optimal calcination conditions in combination with exercising strict control over the compositional ratios, and this makes possible a substantial improvement in the irreversible capacity and initial charge/discharge efficiency over that heretofore available, and can also improve the rate characteristic. The present invention was achieved based on this knowledge.

Thus, the positive electrode active material according to the present invention for nonaqueous electrolyte secondary batteries characteristically contains a hexagonal lithium nickel complex oxide that has a layer structure and is represented by the general formula $Li_xNi_{1-y-z}Co_yM_zO_2$ ($0.98 \leq x \leq 1.04$, $0.25 \leq y \leq 0.40$, $0 \leq z \leq 0.07$, and M is at least one element selected from Al, Ti, Mn, Ga, Mg, and Nb), wherein a lithium occupancy rate in a lithium main layer as obtained by Rietveld analysis from the x-ray diffraction pattern is at least 98.7%, and a crystallite diameter as calculated from the peak for the (003) plane in x-ray diffraction is 50 to 300 nm.

The specific surface area for this positive electrode active material is preferably 0.3 to 1.0 $m^2/g$, and preferably the average particle diameter of the primary particles constituting this positive electrode active material is 0.1 to 1 μm, secondary particles are formed by the aggregation of a plurality of the primary particles, and the secondary particles have a spherical or oval shape.

The method of the present invention for producing the positive electrode active material for nonaqueous electrolyte secondary batteries, is characteristically provided with:

a coprecipitation step of obtaining at least a cobalt-containing nickel complex hydroxide by carrying out a coprecipitation by adding an alkali solution to a mixed aqueous solution containing at least a nickel salt and a cobalt salt and stirring the same;

a heat treatment step of obtaining a nickel complex oxide by heat treating the obtained nickel complex hydroxide at a temperature of 450 to 750° C.;

a mixing step of obtaining a lithium mixture by mixing the obtained nickel complex oxide with a lithium compound according to prescribed amounts the oxide and the compound; and a calcination step of calcining the obtained lithium mixture at a temperature of 720 to 830° C. in an oxygen atmosphere thereby obtaining a lithium nickel complex oxide.

The nickel complex oxide and the lithium compound are preferably mixed in the mixing step so that an atomic ratio (Li/Me) between the lithium (Li) in the lithium compound and the sum (Me) for metal elements in the nickel complex oxide is 0.98 to 1.04, while lithium hydroxide or a hydrate thereof is preferably used for the lithium compound.

Calcination in the calcination step is preferably carried out at 735 to 820° C., and a preliminary calcination is preferably carried out prior to the calcination, this preliminary calcination being performed in a range from 450 to 800° C. and at a temperature lower than the temperature at which the calcination is performed.

The nonaqueous electrolyte secondary battery provided by the present invention is characteristically equipped with a positive electrode that uses the subject positive electrode active material.

Advantageous Effects of Invention

The present invention provides a positive electrode active material for nonaqueous electrolyte secondary batteries, that has a high capacity and a low irreversible capacity and in particular an excellent initial charge/discharge efficiency, and that has an excellent rate characteristic. The positive electrode active material according to the present invention is well adapted for application as the positive electrode active material of lithium ion secondary batteries.

In addition, the use of the positive electrode active material according to the present invention for nonaqueous electrolyte secondary batteries, as the positive electrode active material of a nonaqueous secondary battery can provide a secondary battery for which the initial charge/discharge efficiency of the secondary battery is high, the irreversible capacity is small, and the rate characteristic is excellent. Such a battery has a very high degree of industrial and commercial utility because it can satisfy the contemporary demand for higher capacities being placed on the small secondary batteries used in, for example, mobile and portable electronic devices, while also providing a nonaqueous electrolyte secondary battery that can secure the safety and high output characteristics required of the large secondary batteries used as power sources for hybrid vehicles and electric vehicles.

DESCRIPTION OF EMBODIMENTS

The positive electrode active material according to the present invention for nonaqueous electrolyte secondary batteries characteristically contains a hexagonal lithium nickel complex oxide that has a layer structure and is represented by the general formula $Li_xNi_{1-y-z}Co_yM_zO_2$ ($0.98 \leq x \leq 1.04$, $0.25 \leq y \leq 0.40$, $0 \leq z \leq 0.07$, and M is at least one element selected from Al, Ti, Mn, Ga, Mg, and Nb), wherein the lithium occupancy rate in the lithium main layer as obtained by Rietveld analysis from the x-ray diffraction pattern is at least 98.7% and the crystallite diameter as calculated from the peak for the (003) plane in x-ray diffraction is 50 to 300 nm.

It is critical for the positive electrode active material of the present invention that y, which gives the Co content, be in the range $0.25 \leq y \leq 0.40$ and that the lithium occupancy rate in the lithium main layer, as obtained by Rietveld analysis of the x-ray diffraction pattern, be at least 98.7%. When these are accomplished, the degree of perfection of the crystal structure is enhanced, and a positive electrode active material with a low irreversible capacity, an excellent initial charge/discharge efficiency, and excellent battery characteristics can be obtained.

The degree of perfection of the crystal structure can be investigated by x-ray diffraction using Rietveld analysis (for example, R. A. Young, ed., "The Rietveld Method", Oxford University Press (1992)), where the occupancy rates of the various ions are used as indexes. The 3a, 3b, and 6c sites are present in the case of a compound in the hexagonal crystal system, and, for $LiNiO_2$ with the perfect stoichiometric composition, the site occupancy rate by lithium (Li) at the 3a site is 100%, the site occupancy rate by nickel (Ni) at the 3b site is 100%, and the site occupancy rate by oxygen (O) at the 6c site is 100%. As a general matter, a lithium nickel complex oxide in which the Li ion occupancy rate at the 3a site, which is the lithium main layer, is at least 97% can be regarded as having an excellent degree of perfection in the crystal structure.

The present invention relates to an active material for which the irreversible capacity and the initial charge/discharge efficiency have been improved by substituting cobalt (Co) for a portion of the Ni in the crystal structure. The thermal stability and storage characteristics can also be improved by substituting the metal element M (M is at least one element selected from Al, Ti, Mn, Ga, Mg, and Nb) for a portion of the Ni.

The charge/discharge reactions of the secondary battery proceed via the reversible insertion and extraction of the lithium ion at the 3a site. Thus, when another metal ion is co-introduced at the 3a site, which forms a diffusion pathway for the Li in the solid phase, the degree of perfection of the crystal structure is lowered and the diffusion pathway is obstructed, and this can cause the charge/discharge characteristics of the battery to deteriorate.

As a result of extensive investigations into positive electrode active materials synthesized by various methods, the present inventors discovered that there is a close relationship between the irreversible capacity and the lithium occupancy rate at the 3a site as determined by Rietveld analysis of the powder x-ray diffraction pattern, and that—by using a positive electrode active material having a very high degree of perfection for the crystal structure of at least 98.7% for the lithium occupancy rate at the 3a site as obtained from the results of Rietveld analysis of the x-ray diffraction pattern—the Li diffusion pathways in the solid phase can be secured and maintained and the irreversible capacity can then be reduced and the initial charge/discharge capacity can be further improved.

Thus, in the case of a low degree of perfection for the crystal structure, the lithium ion extracted during charging cannot return to the interior of the crystal during discharge and the irreversible capacity, which is the difference between the amount of charging and the amount of discharge, is then large. By raising the degree of perfection of the crystal structure, a decline can be achieved in the lithium ion that does not return during discharge and the irreversible capacity can then be reduced and the initial charge/discharge efficiency can be further improved.

It was found that a positive electrode active material having such a high lithium occupancy rate at the 3a site depends on the Co content ratio and that the lithium occupancy rate at the 3a site could be brought to 98.7% or more by having y, which represents the Co content, in the preceding general formula be in the range of equal to or greater than 0.25.

On the other hand, since lithium nickel complex oxides do not have a high crystal stability, when the nickel main layer, i.e., the 3b site, is populated by only nickel the degree of perfection of the crystal structure is lowered by charge/discharge and the irreversible capacity increases. Due to this, the crystal stability can be improved by the addition of Co to the lithium nickel complex oxide and the degree of perfection of the crystal structure can then be maintained and the irreversible capacity can be reduced and the charge/discharge efficiency can be improved.

As noted in the preceding, a satisfactory degree of perfection is obtained for the crystal structure and its degree of perfection is stabilized by adding Co in combination with having the lithium occupancy rate at the 3a site be at least 98.7%. As a consequence of this, the irreversible capacity and the charge/discharge efficiency, which have been a problem with lithium nickel complex oxides, can be substantially improved.

As a result of additional investigations, the present inventors discovered that when x, which represents the ratio between Li and the non-Li metal elements (Li/(Ni+Co+M)), is controlled into the range of 0.98≤x≤1.04, a high charge/discharge capacity can be obtained while maintaining the degree of perfection of the subject crystal structure.

A detailed description is provided in the following for the positive electrode active material according to the present invention for nonaqueous electrolyte secondary batteries, the method of producing this positive electrode active material, and nonaqueous electrolyte secondary batteries that use this positive electrode active material.

(1) The Positive Electrode Active Material for Nonaqueous Electrolyte Secondary Batteries The positive electrode active material according to the present invention for nonaqueous electrolyte secondary batteries contains a hexagonal lithium nickel complex oxide having a layer structure and represented by the general formula $Li_xNi_{1-y-z}Co_yM_zO_2$ (0.98≤x≤1.04, 0.25≤y≤0.40, 0≤z≤0.07, and M is at least one element selected from Al, Ti, Mn, Ga, Mg, and Nb).

The x represents the ratio between the Li and the non-Li metal elements (Li/(Ni+Co+M)). When this x is less than 0.98, the lithium nickel complex oxide is then deficient in Li and much non-Li metal element is co-introduced at the 3a site and the lithium occupancy rate at the 3a site cannot be brought to 98.7% or more. When, on the other hand, x exceeds 1.04, the lithium occupancy rate can be brought to 98.7% or more, but much Li is co-introduced at the 3b site and the Ni at the 3b site, which contributes to the charge/discharge reactions, is depleted and the charge/discharge capacity is reduced as a consequence.

By having the range for this x be 0.98≤x≤1.04 and preferably 1.00≤x≤1.04, a satisfactory Li presence at the 3a site is obtained and the degree of perfection of the crystal structure is then secured, and in combination with this the co-introduction of Li at the 3b site is inhibited and a high charge/discharge capacity can be obtained.

It is essential that y, which indicates the Co content, be at least 0.25 in order to ensure the degree of perfection and stabilization of the crystal structure. A satisfactory degree of perfection and stabilization cannot be obtained for the crystal structure when y is less than 0.25. When, on the other hand, y exceeds 0.40, the Ni is oversubstituted by Co and a satisfactory battery capacity is then not obtained in use as a positive electrode active material.

By having the range for y be 0.25≤y≤0.40 and preferably 0.25≤y≤0.35, a balance can be secured between a high battery capacity and a high initial charge/discharge efficiency due to the degree of perfection and stabilization of the crystal structure.

As indicated in the preceding, by controlling x and y into the indicated ranges, a high charge/discharge capacity can be obtained while also obtaining a substantial improvement in the irreversible capacity and initial charge/discharge efficiency.

The metal element M is at least one element selected from Al, Ti, Mn, Ga, Mg, and Nb and can be added on an optional basis in order to improve the thermal stability and storage characteristics and improve the battery characteristics. Al, Ti, Mn, and Mg are preferred among the preceding.

The lithium occupancy rate and the charge/discharge capacity may decline when the metal element M is added in large amounts, and for this reason z, which represents its amount of addition, is set at not more than 0.07 and preferably not more than 0.05 and more preferably not more than 0.03. Having this z be not more than 0.03 makes it possible to obtain the effects of an even higher initial charge/discharge efficiency and improved battery characteristics. Depending on its purpose, the metal element M may assume a state in which it is uniformly dissolved in the lithium nickel complex oxide or may assume a state in which it is concentrated in the vicinity of the particle surface or coats the surface.

In order to achieve additional reductions in the irreversible capacity, the positive electrode active material of the present invention is also characterized by a crystallite diameter, as calculated from the peak for the (003) plane in x-ray diffraction, of 50 to 300 nm and preferably 100 to 250 nm.

When the positive electrode active material forms secondary particles through the aggregation of smaller primary particles, fine gaps can be created among the primary particles in the interior of the secondary particles by causing the individual primary particles to undergo a certain degree of growth. The electrolyte solution can then infiltrate into the gaps among these primary particles, and Li ion supply is then made possible by the penetration of the electrolyte solution into the interior of the secondary particles. It is thought that the rate of Li ion diffusion into the secondary particle as a whole is fast as a result and the irreversible capacity is then reduced.

The degree of primary particle growth can be evaluated using the crystallite diameter calculated from the peak for the (003) plane in x-ray diffraction. The present inventors discovered that by having the crystallite diameter be 50 to 300 nm, a positive electrode active material can be obtained in which the packing behavior co-exists in good balance with the reduction in the irreversible capacity. While the primary particles making up the positive electrode active material are preferably smaller from the standpoint of the area of contact with the electrolyte solution, at a crystallite diameter of less than 50 nm the primary particles become too finely divided and the molding density for the positive electrode becomes too low and high charge/discharge characteristics are then not obtained. When, on the other hand, the crystallite diameter exceeds 300 nm, infiltration of the electrolyte solution among the primary particles in the secondary particle interior is inadequate and the irreversible capacity cannot be lowered. In addition, the use of such a positive electrode active material is also unfavorable due to the risk that the oxygen release behavior will deteriorate when the temperature is raised in the charged state.

Viewed from the standpoint of improving the rate characteristic, the crystallite diameter is more preferably 120 to 200 nm. Additional improvements in the rate characteristic are made possible by having the crystallite diameter be in the indicated range because the primary particles are then in good contact with each other, thereby providing an excellent Li ion conduction, and because a thorough infiltration of the electrolyte solution among the primary particles in the secondary particle interior is obtained.

The specific surface area of the subject positive electrode active material is preferably 0.3 to 1.0 m$^2$/g. This makes possible a thorough contact between the positive electrode active material and the electrolyte solution, thereby speeding up the Li ion diffusion rate and enabling a further reduction in the irreversible capacity. When the specific surface area is less than 0.3 m$^2$/g, contact between the positive electrode active material and the electrolyte solution is diminished and the effect of a reduction in the irreversible capacity may not be obtained. On the other hand, the primary particles may become too finely divided when the specific surface area exceeds 1.0 m$^2$/g.

The average particle diameter of the primary particles making up the positive electrode active material is preferably 0.1 to 1 μm for this positive electrode active material. The packing behavior on the positive electrode may decline when the average particle diameter of the primary particles is less than 0.1μ. When, on the other hand, the average particle diameter of the primary particles exceeds 1 μm, the contact between the positive electrode active material and the electrolyte solution is diminished and the effect of a reduction in the irreversible capacity may not be obtained.

The average particle diameter of the primary particles can be determined by measuring, for example, using a scanning electron microscope (SEM), the maximum diameter (μm)—which serves as the individual particle diameter—of at least 100 primary particles and calculating the numerical mean value of these particle diameters.

Preferably secondary particles are formed by the aggregation of a plurality of these primary particles, and the shape of these secondary particles is preferably spherical or oval. The result of this is the formation of appropriate gaps among the primary particles, which makes it possible for the packing behavior on the positive electrode and the reduction in the irreversible capacity to co-exist in good balance at even higher levels.

The nonaqueous electrolyte secondary battery according to the present invention characteristically uses in its positive electrode the hereinabove-described positive electrode active material for nonaqueous electrolyte secondary batteries.

The average primary particle diameter is preferably at least 0.1 μm in order to raise the packing density for the positive electrode in the battery. Moreover, secondary particles are preferably formed by the aggregation of a plurality of these primary particles. The packing behavior is improved through the formation of secondary particles, and this is preferred from the standpoint of molding the electrode. In order to secure a particularly good packing behavior, the secondary particles preferably have a spherical or oval shape.

In addition, when considered from the standpoint of the fitness as a positive electrode material, e.g., with regard to the packing behavior and so forth, D50, which is the 50% diameter on a volume basis in the particle size distribution that gives the average particle diameter of the secondary particles in the positive electrode active material, is preferably 3.5 to 15.0 μm and the tap density is preferably at least 2.0 g/mL. While a higher tap density is preferred from the standpoint of the packing behavior, the practical upper limit is about 3.5 g/mL.

The average particle diameter of the secondary particles can be measured, for example, using a laser diffraction/scattering method.

When used, for example, in the positive electrode of the 2032-type coin battery that is given in the embodiments of the present application, the positive electrode active material according to the present invention for nonaqueous electrolyte secondary batteries exhibits a high initial discharge capacity of at least 170 mAh/g, a rate characteristic of at least 92%, and an initial charge/discharge efficiency of at least 94%, and thus provides a battery with an excellent initial charge/discharge efficiency at a high capacity. Moreover, optimization can raise the rate characteristic to at least 94% and more preferably to at least 95% while maintaining the high initial discharge capacity, thus providing a positive electrode material with which a high output is obtained at a high capacity. Here, the rate characteristic is the rate characteristic calculated by the ratio of the battery capacity when the current density is 1 C relative to the battery capacity when the current density is 0.2 C.

Moreover, the positive electrode active material of the present invention for nonaqueous electrolyte secondary batteries has a higher thermal stability than the positive electrode active materials from conventional lithium nickel-type oxides and can also be regarded as having an excellent safety.

(2) The Method of Producing the Positive Electrode Active Material for Nonaqueous Electrolyte Secondary Batteries The method of producing this positive electrode active material is characteristically provided with a coprecipitation step of obtaining at least a cobalt-containing nickel complex hydroxide by adding an alkali solution to a mixed aqueous solution containing at least a nickel salt and a cobalt salt and stirring this to effect crystallization by a coprecipitation reaction; a heat treatment step of obtaining a nickel complex oxide by heat treating the obtained nickel complex hydroxide at a temperature of 450 to 750° C.; a mixing step of obtaining a lithium mixture by mixing the obtained nickel complex oxide with a lithium compound using prescribed amounts for each; and a calcination step of calcining the obtained lithium mixture at a temperature of 720° C. to 830° C. in an oxygen atmosphere to thereby obtain a lithium nickel complex oxide.

In order with this production method to bring about a satisfactory realization of the effect of reducing the irreversible capacity and achieve a high initial charge/discharge efficiency, a lithium nickel complex oxide must be obtained in a state in which the Ni and Co composition has undergone a thorough and homogeneous dissolution, and in each step the Ni and Co must be dissolved while also being uniformly distributed.

First, a nickel complex hydroxide with the general formula: $Ni_{1-y-z}Co_yM_z(OH)_2$ (0.25≤y≤0.40, 0≤z≤0.07, and M is at least one element selected from Al, Ti, Mn, Ga, Mg, and Nb) is obtained in the coprecipitation step. Here, a mixed aqueous solution containing at least a nickel salt and a cobalt salt must be used for the mixed aqueous solution. By having mixing the nickel and cobalt to uniformity in advance at the mixed aqueous solution stage, a complex hydroxide is obtained in which they are uniformly distributed at a prescribed atomic ratio between the two elements, thus also providing a state for the ultimately obtained positive electrode active material in which the nickel and cobalt composition has undergone a thorough and homogeneous dissolution.

The pH of the mixed aqueous solution is preferably controlled in the coprecipitation step into the range of 11 to 13 by the addition of the aforementioned alkali solution. At a pH below 11, the particles of the precipitated nickel complex hydroxide become coarse and the average particle diameter of their secondary particles may then end up exceeding 15 μm. In addition, nickel will remain in the solution post-reaction, creating the risk of deviations in the composition. When, on the other hand, the pH exceeds 13, a fast nickel complex hydroxide crystallization rate occurs and many very finely divided particles may then appear. When too many very finely divided particles are present, their calcination may result in the production of an agglomerated powder.

There are no particular limitations on the alkali solution that is added to the mixed aqueous solution, and, for example, an aqueous alkali metal hydroxide solution of, e.g., sodium hydroxide or potassium hydroxide, may be used. While the alkali metal hydroxide may be added directly to the mixed aqueous solution, it is preferably added as an aqueous solution from the standpoint of the ease of controlling the pH. There are also no particular limitations on the method of adding the alkali solution, and it may advantageously be added using a flow rate-controllable pump, e.g., a metering pump, while thoroughly stirring the mixed aqueous solution.

The temperature of the mixed aqueous solution during coprecipitation is preferably held at 30 to 60° C. When the temperature of the mixed aqueous solution is below 30° C., the salts have a low solubility in the mixed aqueous solution, resulting in a low salt concentration, and due to this the nickel complex hydroxide crystals may not undergo adequate growth. When the temperature of the mixed aqueous solution exceeds 60° C., extensive crystal nuclei production occurs, leading to many microfine particles and as a consequence preventing the nickel complex hydroxide particles from assuming high densities. Since the crystallinity of the hydroxide influences the primary particle diameter and crystallite diameter of the ultimately obtained lithium nickel complex oxide, the crystallization conditions are adjusted so as to obtain a suitable crystallinity.

The salt concentration in the nickel salt+cobalt salt mixed aqueous solution is preferably 1.0 to 2.2 mol/L for the sum of the individual salts. The salt concentration is low at less than 1.0 mol/L, and the nickel complex hydroxide crystals may then not undergo adequate growth. At more than 2.2 mol/L, on the other hand, the saturation concentration at normal temperatures is exceeded, resulting in reprecipitation of the crystals and raising the risk of, for example, pipe clogging; in addition, extensive crystal nuclei production occurs, leading to many microfine particles.

Nickel salts and cobalt salts that can be used here should be water-soluble salts but are not otherwise particularly limited, and sulfate salts, nitrate salts, and chlorides are preferably used. Among these salts, sulfate salts are particularly preferred because they have little admixed impurity.

A complexing agent may be used in the coprecipitation step. The nickel solubility in the mixed aqueous solution is stabilized through the use of a complexing agent, and as a consequence a nickel complex hydroxide having a stabilized composition and powder properties may then be obtained. There are no particular limitations on the complexing agent used in the coprecipitation step, and the complexing agent should be able to form a complex by binding with the nickel ion and cobalt ion in the aqueous solution. The complexing agent can be exemplified by ammonium ion donors (e.g., ammonia, ammonium sulfate, ammonium chloride, ammonium carbonate, and ammonium fluoride), ethylenediaminetetraacetic acid, nitrilotriacetic acid, uracil diacetic acid, and glycine.

The complexing agent should be added in an amount sufficient for the formation of a complex by binding with the nickel ion and cobalt ion in the mixed aqueous solution. 5 to 25 g/L, as the concentration in the solution post-reaction, is preferred when the salt concentration in the mixed aqueous solution is 1.0 to 2.2 mol/L.

The metal element M may be added by either of the following methods: addition during the aforementioned coprecipitation or addition after the complex hydroxide has been obtained. Thus, when the goal is to induce a uniform dispersion of the metal element M within the complex hydroxide, coprecipitation can be carried out in a state in which M is uniformly dispersed within the complex hydroxide by adding an aqueous solution having an M-containing salt dissolved therein to the mixed aqueous solution in the coprecipitation step, or by supplying the mixed aqueous solution and an aqueous solution having an M-containing salt dissolved therein to the reaction vessel at the same time in the coprecipitation step.

When the goal is to coat the surface of the complex hydroxide with the metal element M, the metal element M can be uniformly coated on the surface of the complex hydroxide by, for example, converting the complex hydroxide into a slurry and adding an M-containing aqueous solution while controlling to a prescribed pH value and bringing about the deposition of M on the surface of the complex hydroxide by a precipitation reaction. An alkoxide solution of M may also be used here in place of the M-containing aqueous solution.

When the surface is coated by the metal element M, agreement with the atomic ratio for the metal ion in the obtained complex hydroxide can be brought about by having reduced the atomic ratio for the M ion present in the mixed aqueous solution by the amount that is coated. In addition, the process of coating the particle surface with the metal element M may be carried out on the particles after the complex metal hydroxide has been heat treated.

A water-soluble compound is preferably used for the metal element M (at least one element selected from Al, Ti, Mn, Ga, Mg, and Nb), and, for example, aluminum sulfate, sodium aluminate, titanium sulfate, ammonium peroxotitanate, titanium potassium oxalate, manganese sulfate, magnesium sulfate, magnesium chloride, niobium hydroxide, or niobium pentachloride may be used.

There are no particular limitations on the production regime in the coprecipitation step. While a batch regime can be used, a continuous regime—in which the starting materials are supplied to an overflow pipe-equipped reaction tank and the produced particles can be continuously recovered—is preferred from the standpoint of the productivity and stability.

In the continuous regime, preferably the mixed aqueous solution is supplied in a prescribed amount to a reaction tank while the temperature is held at a prescribed value and the pH is controlled by the addition of an alkali solution and, once the interior of the reaction tank has reached a steady state, the produced particles are continuously recovered from the overflow pipe. Supply to the reaction tank may also be carried out after the complexing agent has been mixed in advance with the mixed aqueous solution; however, the mixed aqueous solution and the complexing agent are preferably supplied to the reaction tank separately in order to prevent production of the nickel complex hydroxide in the mixed aqueous solution when mixing with the complexing agent is carried out.

In either production regime, thorough stirring at a prescribed rate is preferably performed in order to maintain a uniform reaction during coprecipitation. However, excessive stirring may lead to the entrainment of the air atmosphere in large amounts and oxidation of the salt in the aqueous solution, and stirring is therefore preferably carried out to the degree that can maintain a satisfactorily uniform reaction. In order to prevent the introduction of impurities, the water used in the coprecipitation step is preferably water whose impurity content has been reduced as much as possible, for example, pure water.

The nickel complex hydroxide yielded by coprecipitation is filtered and then washed with water and dried. A commonly used method is good for the filtration, for example, a centrifuge or a suction filtration apparatus may be used. The water wash may employ a commonly used method and should be capable of removing the impurities and excess base present in the nickel complex hydroxide. In order to prevent the introduction of impurities, the water used in the water wash is preferably water whose impurity content has been reduced as much as possible.

A nickel complex oxide is then obtained by a heat treatment step in which the obtained complex hydroxide is heat treated at a temperature of 450 to 750° C. and preferably 600° C. to 750° C. With regard to the main objectives of the heat treatment step, it is performed in order to bring about the greatest possible occurrence of the following effects: generating a uniform distribution of the nickel and cobalt in the complex hydroxide; promoting grain growth of the primary particles that form the secondary particles and bringing about a reduction in the specific surface area; and reducing the gaps among the primary particles and causing the tap density to increase.

When the heat treatment temperature is less than 450° C., not only can grain growth of the primary particles not be promoted, but the effect of making the nickel and cobalt distribution become uniform may not be obtained to a satisfactory degree. When, on the other hand, 750° C. is exceeded, substantial grain growth occurs after the complex hydroxide has converted into the oxide and the reactivity with the lithium compound deteriorates and the lithium occupancy rate declines. The heat treatment time is preferably at least 1 hour or more and is more preferably from 5 to 15 hours. At less than 1 hour, removal of the residual moisture fraction may be inadequate, or the conversion from the hydroxide to the oxide may be inadequate.

In order to provide a thorough conversion into the oxide, the heat treatment is preferably run in a nonreducing atmosphere and particularly in an air atmosphere. There are no particular limitations on the oven used for the heat treatment, and it should be capable of carrying out heating in a nonreducing atmosphere. However, an electric oven, which is free of gas production, is preferred, and a batch or continuous oven can be used as appropriate.

A lithium mixture is then obtained in the mixing step by mixing the nickel complex oxide yielded by the heat treatment step with a lithium compound in prescribed amounts for each.

The x in the previously indicated general formula for the ultimately obtained lithium nickel complex oxide approximately agrees with atomic ratio (Li/Me ratio) between the lithium (Li) in the lithium compound and the sum (Me) of the metal elements in the nickel complex oxide, for the nickel complex oxide and lithium compound that are mixed in the mixing step. Accordingly, the Li/Me ratio in the mixing step should agree with the range for x and mixing is preferably carried out so as to provide an Li/Me ratio of 0.98 to 1.04 and preferably 1.00 to 1.04.

Lithium hydroxide or its hydrate, lithium carbonate, and their mixtures are lithium compounds that can be favorably used in the method of the present invention for producing the positive electrode active material for nonaqueous electrolyte secondary batteries. However, the use of lithium hydroxide or its hydrate is particularly preferred for bringing the lithium occupancy rate to 98.7% or more. Due to its melting during calcination in the next step, lithium hydroxide can raise the lithium occupancy rate due to its uniform reaction with the nickel complex oxide. In addition, the lithium hydroxide is preferably pulverized before use in order to achieve a more uniform particle-to-particle composition in the lithium nickel complex oxide, and pulverization to 20 μm or less is more preferred. However, a lower limit of 2 μm is preferred from the standpoint of the ease of handling.

The nickel complex oxide and the lithium compound are preferably thoroughly mixed prior to the calcination. The usual mixers can be used for this mixing; for example, thorough mixing with the lithium compound to a degree that does not disrupt the nickel complex oxide skeleton may be carried out using a shaker mixer, Loedige mixer, Julia mixer, V-blender, and so forth.

The calcination step performed subsequent to the mixing step is a step that yields the lithium nickel complex oxide by the calcination, at a temperature of 720° C. to 830° C. in an oxygen atmosphere, of the lithium mixture provided by the mixing step. The calcination temperature in the calcination step is in the range from 720° C. to 830° C.; however, the range of 735 to 820° C. is more preferred for the purpose of bringing the crystallite diameter to a preferred size, while the range of 760 to 820° C. is even more preferred for the purpose of raising the homogeneity of the composition. When the calcination temperature is less than 720° C., crystallization through the reaction of the lithium compound and nickel complex oxide does not proceed to a satisfactory degree and it becomes quite difficult to synthesize the subject layer-structured lithium nickel complex oxide. In addition, the crystallite diameter in some cases may not reach to 120 nm or more when the calcination temperature is less than 735° C. When, on the other hand, 830° C. is exceeded, the layer structure is disrupted due to the co-introduction of non-lithium metal elements at the 3a site, which is the lithium main layer, and the co-introduction of Li at the 3b site, which is the nickel main layer, and the lithium occupancy rate at the 3a site then falls below 98.7%. As a consequence, a high rate of metal ion co-introduction at the 3a site occurs and the lithium ion diffusion pathways are obstructed, and a battery that uses such a positive electrode then exhibits a reduced initial capacity and an increase in the irreversible capacity.

The calcination time is preferably 5 to 50 hours and more preferably 5 to 25 hours. A thorough production of the lithium nickel complex oxide may not occur at less than 5 hours.

The calcination step preferably also includes, prior to the calcination, a preliminary calcination at a temperature in the range from 450 to 800° C. that is also lower than the temperature at which calcination is performed. By doing this, the reaction with lithium is promoted by holding at a temperature in the vicinity of the temperature of the reaction with the lithium compound and a uniform lithium nickel complex oxide can then be obtained. The holding time in the preliminary calcination is preferably from about 1 to 10 hours in order to obtain a satisfactory effect from the preliminary calcination.

An oxygen atmosphere is used for the calcination atmosphere. The reaction between the lithium compound and nickel complex oxide is an oxygen-consuming reaction, and a lithium nickel complex oxide with an excellent crystallinity can be obtained by establishing an adequate supply of oxygen to the reaction field.

There are no particular limitations on the oven used for the calcination, and it should be capable of carrying out heating in an oxygen atmosphere. However, an electric oven, which is free of gas production, is preferred, and a batch or continuous oven can be used as appropriate.

(3) The Nonaqueous Electrolyte Secondary Battery

The nonaqueous electrolyte secondary battery of the present invention contains a positive electrode, a negative electrode, a nonaqueous electrolyte solution, and so forth, and is constructed from the same structural elements as the usual nonaqueous electrolyte secondary batteries. The embodiments described below are nothing more than examples, and the nonaqueous electrolyte secondary battery of the present invention can be implemented, starting with these embodiments, by structures provided by the execution of various modifications and improvements based on the knowledge of those skilled in the art. There are, moreover, no particular limitations on the applications of the nonaqueous electrolyte secondary battery of the present invention. The individual structural elements are described in the following.

(The Positive Electrode)

The positive electrode, which uses the positive electrode active material of the present invention, may be fabricated, for example, as follows.

The powdered positive electrode active material, an electroconductive material, and a binder are mixed; an active carbon, a solvent for viscosity adjustment, and so forth are added on an optional basis; and a positive electrode mixture paste is then prepared by kneading. The mixing proportion for each in the positive electrode mixture is also an important factor for determining the properties of the lithium secondary battery. Letting the total mass of the solids fraction of the positive electrode mixture excluding the solvent be 100 mass %, it is desirable for the positive electrode active material content to be 60 to 95 mass %, the electroconductive material content to be 1 to 20 mass %, and the binder content to be 1 to 20 mass %, which in each case is the same as in an ordinary lithium secondary battery. The resulting positive electrode mixture paste is, for example, coated on the surface of an aluminum foil current collector and dried to drive off the solvent. As necessary, compression may be applied using, for example, a roll press, in order to raise the density of the electrode. A sheet-shaped positive electrode can be fabricated by proceeding in the described manner. The sheet-shaped positive electrode can be, inter alia, cut to a suitable size in conformity with the intended battery and then supplied to battery fabrication. However, the positive electrode fabrication method is not limited to this example and other methods may be used.

For example, graphite (e.g., natural graphite, synthetic graphite, expanded graphite) or a carbon black material, e.g., acetylene black, Ketjen black, and so forth, can be used as the electroconductive material in the fabrication of this positive electrode.

The binder functions to anchor the active material particles, and, for example, a fluororesin, e.g., polytetrafluoroethylene, polyvinylidene fluoride, or a fluororubber; a thermoplastic resin, e.g., polypropylene or polyethylene; ethylene-propylene diene rubber; styrene-butadiene; a cellulosic resin; or a polyacrylic acid can be used. As necessary, a solvent that disperses the positive electrode active material, electroconductive material, and active carbon and dissolves the binder, may be added to the positive electrode mixture. In specific terms, an organic solvent such as N-methyl-2-pyrrolidone can be used as the solvent. Active carbon can be added to the positive electrode mixture in order to increase the electric double-layer capacitance.

(The Negative Electrode)

For example, lithium metal or a lithium alloy is used for the negative electrode. Or, a negative electrode is used that is formed by mixing a binder into a negative electrode active material that is capable of the insertion and extraction of the lithium ion; a suitable solvent is added to give a negative electrode mixture in the form of a slurry; this negative electrode mixture is coated on the surface of a metal foil current collector, e.g., of copper; drying is carried out; and as necessary compression is applied in order to raise the density of the electrode.

For example, natural graphite, synthetic graphite, the calcinate of an organic compound such as a phenolic resin, or the particulate of a carbon material such as coke can be used as the negative electrode active material. The binder for the negative electrode may be the same as for the positive electrode, and, for example, a fluororesin such as polyvinylidene fluoride can be used. An organic solvent such as, for example, N-methyl-2-pyrrolidone, can be used as the solvent for dispersing this active material and the binder.

(The Separator)

A separator is disposed sandwiched between the positive electrode and the negative electrode. The separator separates the positive electrode from the negative electrode and holds the electrolyte and is a thin film of, for example, polyethylene or polypropylene. A film having a large number of microfine holes can be used.

(The Nonaqueous Electrolyte Solution)

The nonaqueous electrolyte solution is a nonaqueous electrolyte solution in which a lithium salt is dissolved as a supporting salt in an organic solvent.

The organic solvent can be a single selection or a mixture of two or more selections from, for example, cyclic carbonates such as ethylene carbonate, propylene carbonate, butylene carbonate, and trifluoropropylene carbonate; chain carbonates such as diethyl carbonate, dimethyl carbonate, ethyl methyl carbonate, and dipropyl carbonate; ether compounds such as tetrahydrofuran, 2-methyltetrahydrofuran, and dimethoxyethane; sulfur compounds such as ethyl methyl sulfone and butane sultone; and phosphorus compounds such as triethyl phosphate and trioctyl phosphate.

$LiPF_6$, $LiBF_4$, $LiClO_4$, $LiAsF_6$, $LiN(CF_3SO_2)_2$, and so forth and their complex salts can be used as the supporting salt. The nonaqueous electrolyte may additionally contain a radical scavenger, a surfactant, a flame retardant, and so forth.

(The Shape and Structure of the Battery)

The lithium secondary battery according to the present invention, which is constructed of the positive electrode, negative electrode, separator, and nonaqueous electrolyte solution as described above, can have various shapes, e.g., cylindrical, laminated, and so forth.

Regardless of the shape taken, an electrode assembly is made by stacking the positive electrode and negative electrode with the separator interposed therebetween, and this electrode assembly is immersed in the nonaqueous electrolyte solution. Connection is made, using, for example, a current collection lead, between the positive electrode current collector and a positive electrode terminal that penetrates to the exterior, and between the negative electrode current collector and a negative electrode terminal that penetrates to the exterior. The resulting structure is sealed in a battery case to complete the battery.

EXAMPLES

The present invention is described in additional detail by the examples of the present invention and comparative examples provided below; however, the present invention is in no way limited to or by these examples.

Example 1

In order to synthesize $Li_{1.02}Ni_{0.70}Co_{0.30}O_2$, in which 30 atom % of the Ni is substituted by Co, a mixed aqueous solution was obtained by dissolving a mixture of nickel sulfate and cobalt sulfate in pure water by a suitable method so as to provide a molar ratio between the nickel and cobalt of 70:30. Then, while this mixed aqueous solution was being stirred in a reaction tank with a stirring blade at 500 rpm and 50° C., a 25 mass % aqueous sodium hydroxide solution was added in order to adjust the pH value in the reaction tank to 12.6 and the salt concentration to 2.0 mol/L for the sum of the nickel salt and cobalt salt, and a nickel complex hydroxide given by $Ni_{0.70}Co_{0.30}(OH)_2$ was obtained by coprecipitation. This complex hydroxide precipitate was filtered, washed with water and filtered, and dried in an air atmosphere.

Using an electric oven, this complex hydroxide was heat treated for 10 hours at 700° C. in an air atmosphere to obtain a nickel complex oxide in which nickel and cobalt were in solid solution at a nickel:cobalt molar ratio of 70:30. This nickel complex oxide and a commercially available lithium hydroxide monohydrate (FMC Corporation) were weighed out so as to provide an atomic ratio (Li/Me ratio) between the lithium and the sum of the non-lithium metal elements (Ni+Co=Me) of 1.02, and a lithium mixture was then obtained by thoroughly mixing using a mixer (Spartan Ryuzer from Fuji Paudal Co., Ltd.).

The resulting lithium mixture was filled into a cordierite sagger; a preliminary calcination was performed by raising the temperature at a ramp rate of 2° C./minute and holding for 5 hours at 500° C. in an oxygen atmosphere; the temperature was then raised at the same ramp rate and a calcination was performed for 12 hours at 790° C.; and this was followed by oven cooling to room temperature. The obtained lithium nickel complex oxide was pulverized and classified to obtain a positive electrode active material.

The obtained positive electrode active material was submitted to a determination of its composition by chemical analysis using ICP atomic emission spectroscopy and to measurement of its specific area by the BET method. In addition, the obtained positive electrode active material was submitted to SEM observation, and the average particle diameter of the primary particles (number of particles measured: 100) was found to be 0.2 μm and spherical secondary particles were found to be formed by the aggregation of a plurality of these primary particles. In addition, the average particle diameter (D50) of the secondary particles, as determined from the results of measurement of the particle size distribution by laser diffraction/scattering, was 10.5 μm. This positive electrode active material was found to be the desired hexagonal positive electrode active material having a layer structure when it was analyzed by x-ray diffraction using the Kα line of Cu. The lithium occupancy rate at the 3a site was determined from Rietveld analysis of the powder x-ray diffraction pattern, and the crystallite diameter was calculated using the Scherrer equation from the peak for the (003) plane in x-ray diffraction.

Figure 1:
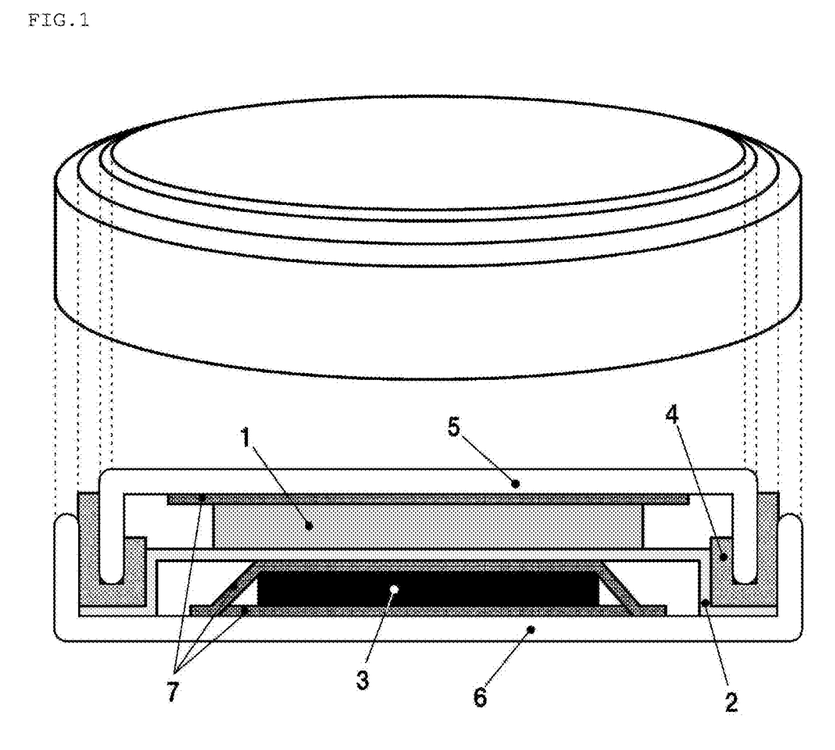
FIG. 1 is a cross-sectional diagram of a coin battery used in the battery evaluations.

The battery evaluation was performed on the obtained positive electrode active material as follows. 20 mass % acetylene black and 10 mass % PTFE were mixed into 70 mass % of the positive electrode active material, and 150 mg of this was taken and a pellet was produced therefrom to make a positive electrode. Lithium metal was used as the negative electrode, while the electrolyte solution was a mixed solution (from Tomiyama Pure Chemical Industries, Ltd.) of equal amounts of ethylene carbonate (EC) and diethyl carbonate (DEC) containing 1 M $LiClO_4$ as the supporting salt. The 2032-type coin battery shown in FIG. 1 was then fabricated operating in a glove box under an Ar atmosphere controlled to a dew point of −80° C.

Figure 2:
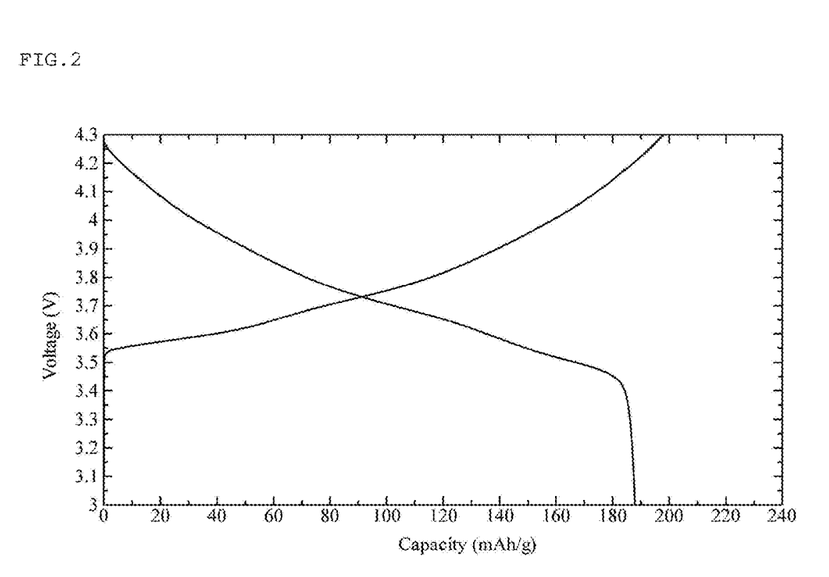
FIG. 2 is the charge/discharge curve obtained in Example 1.

The fabricated battery was allowed to stand for about 24 hours and, after the open circuit voltage (OCV) had stabilized, charging was carried out to a cutoff voltage of 4.3 V using a current density relative to the positive electrode of 0.5 $mA/cm^2$ to provide the initial charging capacity. The initial discharge capacity was taken to be the capacity when, after resting for 1 hour, discharge was carried out to a cutoff voltage of 3.0 V. The irreversible capacity (initial charging capacity−initial discharge capacity) and the initial charge/discharge efficiency (initial discharge capacity×100/initial charging capacity) were calculated from this initial charging capacity and initial discharge capacity. The charge/discharge curves obtained during the measurement are shown in FIG. 2.

The composition, specific surface area, lithium (Li) occupancy rate, and crystallite diameter of the obtained positive electrode active material are given in Table 1, while its initial charging capacity, initial discharge capacity, and initial charge/discharge efficiency are shown in Table 2.

In order to measure the rate characteristic, a 2032-type coin battery was fabricated by the same procedure as outlined above, with the exception that 17 mass % acetylene black and 8 mass % PTFE were mixed into 75 mass % of the positive electrode active material and 15 mg of this was taken and a pellet was produced therefrom to provide the positive electrode. The rate characteristic was obtained by calculating the ratio of the battery capacity for a current density of 1 C relative to the battery capacity for a current density of 0.2 C. These results are given in Table 3.

Only the conditions that differed from Example 1 are described for the following Examples 2 to 9 and Comparative Examples 1 to 4, and the results provided by evaluations by the same methods as in Example 1 are given in Tables 1 and 2. For the rate characteristic, only the evaluation results for the examples are given in Table 3.

It was also confirmed for Examples 2 to 9 and Comparative Examples 1 to 3 that spherical secondary particles had been formed by the aggregation of a plurality of primary particles and that the positive electrode active material was the desired hexagonal positive electrode active material having a layer structure.

Example 2

A positive electrode active material was obtained and evaluated using the same methods as in Example 1, with the following exceptions: the mixed aqueous solution was obtained by dissolving nickel sulfate and cobalt sulfate so as to provide a nickel:cobalt molar ratio of 70:27; an aqueous solution in which sodium aluminate was dissolved and the mixed aqueous solution were simultaneously metered into the reaction tank so as to provide a nickel:cobalt:aluminum molar ratio of 70:27:3; the nickel complex oxide and lithium hydroxide monohydrate were mixed so as to provide an Li/Me ratio of 1.01; and 800° C. was used for the calcination temperature. The average particle diameter of the primary particles was 0.2 μm, and the average particle diameter (D50) of the secondary particles was 10.7 μm.

Example 3

A positive electrode active material was obtained and evaluated using the same methods as in Example 1, with the following exceptions: the mixed aqueous solution was obtained by dissolving nickel sulfate and cobalt sulfate so as to provide a nickel:cobalt molar ratio of 67:30; an aqueous solution in which sodium aluminate was dissolved and the mixed aqueous solution were simultaneously metered into the reaction tank so as to provide a nickel:cobalt:aluminum molar ratio of 67:30:3; and the nickel complex oxide and lithium hydroxide monohydrate were mixed so as to provide an Li/Me ratio of 1.03. The average particle diameter of the primary particles was 0.2 µm, and the average particle diameter (D50) of the secondary particles was 10.6 µm.

Example 4

A positive electrode active material was obtained and evaluated using the same methods as in Example 1, with the following exceptions: the mixed aqueous solution was obtained by dissolving nickel sulfate, cobalt sulfate, and manganese sulfate so as to provide a nickel:cobalt:manganese molar ratio of 72:25:3; and 810° C. was used for the calcination temperature. The average particle diameter of the primary particles was 0.2 µm, and the average particle diameter (D50) of the secondary particles was 9.8 µm.

Example 5

A positive electrode active material was obtained and evaluated using the same methods as in Example 1, with the following exceptions: the mixed aqueous solution was obtained by dissolving nickel sulfate, cobalt sulfate, and titanium sulfate so as to provide a nickel:cobalt:titanium molar ratio of 70:27:3; and 820° C. was used for the calcination temperature. The average particle diameter of the primary particles was 0.2 µm, and the average particle diameter (D50) of the secondary particles was 9.7 µm.

Example 6

A positive electrode active material was obtained and evaluated using the same methods as in Example 1, with the following exceptions: the mixed aqueous solution was obtained by dissolving nickel sulfate, cobalt sulfate, and magnesium sulfate so as to provide a nickel:cobalt:magnesium molar ratio of 67:30:3; and the nickel complex oxide and lithium hydroxide monohydrate were mixed so as to provide an Li/Me ratio of 1.00. The average particle diameter of the primary particles was 0.2 µm, and the average particle diameter (D50) of the secondary particles was 10.5 µm.

Example 7

A positive electrode active material was obtained and evaluated using the same methods as in Example 1, with the following exceptions: the mixed aqueous solution was obtained by dissolving nickel sulfate and cobalt sulfate so as to provide a nickel:cobalt molar ratio of 60:37; an aqueous solution in which sodium aluminate was dissolved and the mixed aqueous solution were simultaneously metered into the reaction tank so as to provide a nickel:cobalt:aluminum molar ratio of 60:37:3; the nickel complex oxide and lithium hydroxide monohydrate were mixed so as to provide an Li/Me ratio of 1.01; and 810° C. was used for the calcination temperature. The average particle diameter of the primary particles was 0.2 µm, and the average particle diameter (D50) of the secondary particles was 10.7 µm.

Example 8

A positive electrode active material was obtained and evaluated using the same methods as in Example 1, with the following exceptions: the mixed aqueous solution was obtained by dissolving nickel sulfate and cobalt sulfate so as to provide a nickel:cobalt molar ratio of 65:30; an aqueous solution in which sodium aluminate was dissolved and the mixed aqueous solution were simultaneously metered into the reaction tank so as to provide a nickel:cobalt:aluminum molar ratio of 65:30:5; and the nickel complex oxide and lithium hydroxide monohydrate were mixed so as to provide an Li/Me ratio of 1.01. The average particle diameter of the primary particles was 0.2 µm, and the average particle diameter (D50) of the secondary particles was 10.9 µm.

Example 9

A positive electrode active material was obtained and evaluated using the same methods as in Example 1, with the exception that the temperature during the 12-hour calcination was 720° C. The average particle diameter of the primary particles was 0.1 µm, and the average particle diameter (D50) of the secondary particles was 11.2 µm.

Comparative Example 1

A positive electrode active material was obtained and evaluated using the same methods as in Example 1, with the following exceptions: the mixed aqueous solution was obtained by dissolving nickel sulfate and cobalt sulfate so as to provide a nickel:cobalt molar ratio of 80:20; and the nickel complex oxide and lithium hydroxide monohydrate were mixed so as to provide an Li/Me ratio of 1.01. The average particle diameter of the primary particles was 0.3 µm, and the average particle diameter (D50) of the secondary particles was 11.5 µm.

Comparative Example 2

A positive electrode active material was obtained and evaluated using the same methods as in Example 1, with the exception that the nickel complex oxide and lithium hydroxide monohydrate were mixed so as to provide an Li/Me ratio of 0.97. The average particle diameter of the primary particles was 0.2 µm, and the average particle diameter (D50) of the secondary particles was 10.6 µm.

Comparative Example 3

A positive electrode active material was obtained and evaluated using the same methods as in Example 1, with the following exceptions: the mixed aqueous solution was obtained by dissolving nickel sulfate and cobalt sulfate so as to provide a nickel:cobalt molar ratio of 67:30; an aqueous solution in which sodium aluminate was dissolved and the mixed aqueous solution were simultaneously metered into the reaction tank so as to provide a nickel:cobalt:aluminum molar ratio of 67:30:3; and the nickel complex oxide and lithium hydroxide monohydrate were mixed so as to provide an Li/Me ratio of 1.07. The average particle diameter of the primary particles was 0.2 µm, and the average particle diameter (D50) of the secondary particles was 10.5 µm.

Comparative Example 4

A positive electrode active material was obtained and evaluated using the same methods as in Example 1, with the following exceptions: the mixed aqueous solution was obtained by dissolving nickel sulfate and cobalt sulfate so as to provide a nickel:cobalt molar ratio of 50:50; the nickel complex oxide and lithium hydroxide monohydrate were mixed so as to provide an Li/Me ratio of 1.03; and a calcination temperature of 810° C. was used. The average particle diameter of the primary particles was 0.3 µm, and the average particle diameter (D50) of the secondary particles was 10.9 µm.

[Evaluations]

As shown in Table 2, the lithium nickel complex oxides obtained in Examples 1 to 9 exhibit high discharge capacities of at least 170 mAh/g and exhibit an initial charge/discharge efficiency of at least 94%. The irreversible capacity was from 8.3 to 11.2 mAh/g. Thus, the lithium nickel complex oxide of this application is shown to be a material that has a very low irreversible capacity and an unusually

TABLE 1

| | $Li_xNi_{1-y-z}Co_yM_zO_2$ composition | | | calcination temperature (° C.) | specific surface area (m²/g) | Li occupancy rate (%) | crystallite diameter (nm) |
|---|---|---|---|---|---|---|---|
| | x | y | element M | z | | | | |
| Example 1 | 1.02 | 0.30 | — | 0 | 790 | 0.42 | 99.5 | 160 |
| Example 2 | 1.01 | 0.27 | Al | 0.03 | 800 | 0.50 | 99.2 | 150 |
| Example 3 | 1.03 | 0.30 | Al | 0.03 | 790 | 0.48 | 99.3 | 162 |
| Example 4 | 1.02 | 0.25 | Mn | 0.03 | 810 | 0.40 | 99.0 | 143 |
| Example 5 | 1.02 | 0.27 | Ti | 0.03 | 820 | 0.60 | 98.9 | 130 |
| Example 6 | 1.00 | 0.30 | Mg | 0.03 | 790 | 0.52 | 99.0 | 169 |
| Example 7 | 1.01 | 0.37 | Al | 0.03 | 810 | 0.43 | 99.2 | 140 |
| Example 8 | 1.01 | 0.30 | Al | 0.05 | 790 | 0.58 | 99.0 | 128 |
| Example 9 | 1.02 | 0.30 | — | 0 | 720 | 0.67 | 99.1 | 110 |
| Comparative Example 1 | 1.01 | 0.20 | — | 0 | 790 | 0.39 | 98.6 | 185 |
| Comparative Example 2 | 0.97 | 0.30 | — | 0 | 790 | 0.65 | 98.3 | 130 |
| Comparative Example 3 | 1.07 | 0.30 | Al | 0.03 | 790 | 0.31 | 99.2 | 171 |
| Comparative Example 4 | 1.03 | 0.50 | — | 0 | 810 | 0.28 | 99.1 | 181 |

TABLE 2

| | initial charging capacity (mAh/g) | initial discharge capacity (mAh/g) | initial charge/discharge efficiency (%) |
|---|---|---|---|
| Example 1 | 195.8 | 187.5 | 95.7 |
| Example 2 | 194.1 | 184.1 | 94.8 |
| Example 3 | 186.6 | 177.3 | 95.0 |
| Example 4 | 201.4 | 190.8 | 94.7 |
| Example 5 | 196.2 | 185.0 | 94.3 |
| Example 6 | 188.3 | 177.5 | 94.3 |
| Example 7 | 185.5 | 174.4 | 94.2 |
| Example 8 | 183.1 | 172.1 | 94.0 |
| Example 9 | 197 | 188.2 | 95.5 |
| Comparative Example 1 | 201.3 | 180.2 | 89.5 |
| Comparative Example 2 | 189.8 | 170.2 | 89.7 |
| Comparative Example 3 | 178.3 | 167.4 | 93.8 |
| Comparative Example 4 | 177.2 | 169.2 | 95.5 |

TABLE 3

| | crystallite diameter (nm) | rate characteristic (%) |
|---|---|---|
| Example 1 | 160 | 97.0 |
| Example 2 | 150 | 95.4 |
| Example 3 | 162 | 95.8 |
| Example 4 | 143 | 96.6 |
| Example 5 | 130 | 95.4 |
| Example 6 | 169 | 95.2 |
| Example 7 | 140 | 95.1 |
| Example 8 | 128 | 95.0 |
| Example 9 | 110 | 92.0 | high initial charge/discharge efficiency and that can used as a novel high-capacity positive electrode material. In addition, as shown in Table 3 the lithium nickel complex oxides obtained in Examples 1 to 9 have a rate characteristic of at least 92% and are thus shown to also be favorable for high-output applications. Here, Example 8, due to its large element M addition, presents a lower initial charge/discharge efficiency than in the other examples. In Example 9, the calcination temperature is in the range of the present invention, but is low at 720° C., and as a consequence the crystallite diameter is 110 nm and the rate characteristic is less than 94% and thus the crystallite diameter and the rate characteristic are both lower than in the other examples.

On the other hand, the lithium occupancy rate reaches to less than 98.7% in Comparative Example 1 due to the low cobalt content and in Comparative Example 2 due to the low Li/Me ratio. As a consequence, the irreversible capacity exceeds 19 mAh/g and the initial charge/discharge efficiency is quite low. The lithium occupancy rate is high in Comparative Example 3 due to the high Li/Me ratio. As a consequence, while the irreversible capacity is relatively small, the charge/discharge capacity is low and the initial charge/discharge efficiency is also lower than in the examples at less than 94%. There is also the possibility in Comparative Example 3 that the excess Li may cause problems during battery fabrication such as gelation. Comparative Example 4 has a high Co content, and as a result has a high initial charge/discharge efficiency but a low initial charge/discharge capacity.

INDUSTRIAL APPLICABILITY

The positive electrode active material according to the present invention has a composition that is controlled into an optimal range and has a high degree of crystal perfection, a high capacity, and a low irreversible capacity. Batteries that use such a positive electrode active material are well adapted for application as a power source for small portable and mobile electronic devices and as a power source for electric vehicles, where high capacities are invariably required. With regard to the electric vehicle power source, this applies not only to an electric vehicle that is driven solely by electric energy, but also encompasses the power source for a so-called hybrid vehicle, which uses a combination with an internal combustion engine, e.g., a gasoline engine or diesel engine.

REFERENCE SIGNS LIST 1 lithium metal negative electrode
2 separator (impregnated with electrolyte solution)
3 positive electrode (electrode for evaluation)
4 gasket
5 negative electrode can
6 positive electrode can
7 current collector

The invention claimed is:

1. A positive electrode active material for a nonaqueous electrolyte secondary battery,
the material comprising a hexagonal lithium nickel complex oxide having a layer structure and represented by the general formula $Li_xNi_{1-y-z}Co_yM_zO_2$ (0.98≤x≤1.04, 0.30<y≤0.40, 0≤z≤0.07, and M is at least one element selected from Al, Ti, Mn, Ga, Mg, and Nb),
wherein a lithium occupancy rate in a lithium main layer as obtained by Rietveld analysis from the x-ray diffraction pattern is at least 98.7%,
a crystallite diameter as calculated from the peak for the (003) plane in x-ray diffraction is 50 to 300 nm, and
an initial charge/discharge efficiency is at least 94%, and
wherein the initial charge/discharge efficiency is defined as in a 2032-type coin battery in which the material is used as a positive electrode and lithium metal is used as a negative electrode, when evaluated by carrying out charging to a cutoff voltage of 4.3 V using a current density relative to the positive electrode of 0.5 mA/cm² to provide an initial charging capacity, carrying out discharge to a cutoff voltage of 3.0 V to provide an initial discharging capacity, and obtaining the initial charge/discharge efficiency by calculating the initial discharge capacity ×100/initial charging capacity.

2. The positive electrode active material for a nonaqueous electrolyte secondary battery according to claim 1, wherein the crystallite diameter is 120 to 200 nm.

3. The positive electrode active material for a nonaqueous electrolyte secondary battery according to claim 1, wherein a specific surface area is 0.3 to 1.0 m²/g.

4. The positive electrode active material for a nonaqueous electrolyte secondary battery according to claim 1, wherein
an average particle diameter of the primary particles constituting the positive electrode active material is 0.1 to 1 μm,
secondary particles are formed by the aggregation of a plurality of the primary particles, and
the secondary particles have a spherical or oval shape.

5. A method of producing a positive electrode active material for a nonaqueous electrolyte secondary battery according to claim 1,
the method comprising:
a coprecipitation step of obtaining at least a cobalt-containing nickel complex hydroxide by carrying out a coprecipitation by adding an alkali solution to a mixed aqueous solution containing at least a nickel salt and a cobalt salt and stirring the same;
a heat treatment step of obtaining a nickel complex oxide by heat treating the obtained nickel complex hydroxide at a temperature of 450 to 750° C.;
a mixing step of obtaining a lithium mixture by mixing the obtained nickel complex oxide with a lithium compound according to the amount corresponding to the general formula; and
a calcination step of calcining the obtained lithium mixture at a temperature of 720 to 830° C. in an oxygen atmosphere thereby obtaining a lithium nickel complex oxide.

6. The method of producing a positive electrode active material for a nonaqueous electrolyte secondary battery, according to claim 5, wherein the nickel complex oxide and the lithium compound are mixed in the mixing step so that an atomic ratio (Li/Me) for the lithium (Li) in the lithium compound to the total (Me) for metal elements in the nickel complex oxide is 0.98 to 1.04.

7. The method of producing a positive electrode active material for a nonaqueous electrolyte secondary battery, according to claim 5, wherein lithium hydroxide or a hydrate thereof is used as the lithium compound.

8. The method of producing a positive electrode active material for a nonaqueous electrolyte secondary battery, according to claim 5, wherein calcination is carried out in the calcination step at a temperature of 735 to 820° C.

9. The method of producing a positive electrode active material for a nonaqueous electrolyte secondary battery, according to claim 5, wherein a preliminary calcination is carried out prior to the calcination in the calcination step, the preliminary calcination being performed at a temperature that is in a range from 450 to 800° C. and is lower than the calcination temperature.

10. A nonaqueous electrolyte secondary battery, which is provided with a positive electrode that uses the positive electrode active material according to claim 1.

11. The positive electrode active material for a nonaqueous electrolyte secondary battery according to claim 1, wherein M is Al.

12. The positive electrode active material for a nonaqueous electrolyte secondary battery according to claim 1, wherein M is Ti.

13. The positive electrode active material for a nonaqueous electrolyte secondary battery according to claim 1, wherein M is Mn.

14. The positive electrode active material for a nonaqueous electrolyte secondary battery according to claim 1, wherein M is Mg.

15. The positive electrode active material for a nonaqueous electrolyte secondary battery according to claim 1, wherein M is Nb.

16. The positive electrode active material for a nonaqueous electrolyte secondary battery according to claim 1, wherein z=0.

17. The positive electrode active material for a nonaqueous electrolyte secondary battery according to claim 1, wherein z satisfies 0≤z≤0.03.

* * * * *